United States Patent [19]

Thompson, III et al.

[11] Patent Number: 4,618,374

[45] Date of Patent: Oct. 21, 1986

[54] HIGH SOLIDS PROCESSING OF KAOLINITIC CLAYS WITH POST-LEACHING OXIDATION

[75] Inventors: Thomas D. Thompson, III, Upper Black Eddy, Pa.; Walter J. Polestak, Summit; Robert W. Bradshaw, Brick, both of N.J.

[73] Assignee: Georgia Kaolin Company, Inc., Union, N.J.

[21] Appl. No.: 717,937

[22] Filed: Mar. 29, 1985

[51] Int. Cl.$^4$ .................... C04B 14/00; C04B 33/00
[52] U.S. Cl. .................... 106/288 B; 106/309; 501/149
[58] Field of Search ............... 106/288 B, 309

[56] References Cited

U.S. PATENT DOCUMENTS

3,489,586  6/1970  Chapman et al. ............ 106/288 B
4,002,487  1/1977  Conley ...................... 106/288 B
4,186,027  1/1980  Bell et al. .................. 106/288 B Primary Examiner—Theodore Morris
Attorney, Agent, or Firm—William W. Habelt

[57] ABSTRACT

A process for beneficiating a poor grade crude kaloinitic clay mineral to produce a clay filler for use in papermaking to improve the brightness of the paper product. The crude kaolin clay is blunged with water containing a dispersing agent to form a high solids fluid aqueous clay suspension. This clay suspension is then screened and fractionated to reduce the particle size thereof to 92–95% finer than 2 microns. The fractionated clay suspension is treated with an alkaline leaching solution containing a reducing agent effective in converting ferric ions to ferrous ions and, preferably, a water-soluble anionic phosphate. The leached clay suspension, which has a solids content of at least 55%, is then treated with an oxidizing agent to oxidize unreacted leaching agent and byproducts formed during the leaching process.

7 Claims, 2 Drawing Figures

HIGH SOLIDS PROCESSING OF KAOLINITIC CLAYS WITH POST-LEACHING OXIDATION

BACKGROUND OF THE INVENTION

The present invention relates to the processing of clay minerals and, more particularly, is directed to the processing of kaolinitic clays at high solids under acidic conditions to produce an improved paper filler composition.

It is well known that the incorporation of clay-based filler compositions into the paper web during the formation of paper sheet can significantly improve the optical properties of the resultant paper sheet. This improvement in opacity of the paper sheet by means of incorporation of the clay filler is the result of increased light scattering due primarily to the difference in indices of refraction between the filler, the paper fiber and air, and also due to the increased number of light scattering voids formed in the paper web upon the incorpoation of a clay filler. In order for the clay filler to perform well in improving opacity of the paper, the particle size distribution within the clay filler must be such that a large percentage of the clay particles have equivalent spherical diameters of between 0.6 and 1.5 microns and contain minimal particles with equivalent spherical diameters larger than 45 microns. Further, the paper maker must provide a paper product which meets customer specifications as to color shade. As it is customary to use dyes to obtain the desired paper color, the clay filler should have a good brightness consistent color, preferably showing good whiteness and little red, green, yellow or blue shade.

Unfortunately, very few kaolinitic clays in their crude state have the particle size distribution, the brightness or the color characteristics which are required for a good paper filler composition. For example, although tertiary kaolin clays mined in East Georgia have a fairly good particle size distribution in the crude state, they usually have low brightness and are highly colored. Their coloration varies widely ranging from grey-white to cream to brown to yellow to pink to purple. Additionally, a typical mine pit will contain up to about 60% of a clay having too low a brightness for processing under conventional prior art processes. Accordingly, such East Georgia tertiary kaolins are not, at present, widely used to make paper filler for white paper production.

It has become customary in the industry to beneficiate the crude kaolinitic clays used in clay filler compositions for paper making to improve particle size distribution and also improve color characteristics by removing ferric ion-containing compounds in the clay. Such ferric ion-containing compounds impart a non-white color to the clay and reduce the overall brightness or reflectance to visible light of the clay. It is well known that the effect of these ferric ion-containing compounds may be reduced by treating the clay with a reducing agent which converts the ferric ion to the less highly colored ferrous ion. A variety of reducing agents are known to be suitable for treating kaolinitic clays, but the most commonly used reducing agents are water-soluble dithionites or sulphites, such as sodium dithionite, zinc dithionite, sodium bisulphite, sodium hydrosulphite, and sodium pyrosulphite.

In the conventional process for reducing the ferric iron-containing impurities in a kaolinitic clay to the ferrous state, a low solids aqueous suspension of the crude clay is first formed, then if desired, degritted to remove large particles, and then treated with a reducing agent to convert the ferric ions therein to the ferrous state. The ferrous ion Is generally very soluble in water and will pass into the water in which the clay is suspended. The treated clay is then thickened, dewatered by filtration and the resultant filter cake thermally dried to produce a clay filler product having a high solids content, at least about 65%, suitable for economic transport. Such a low solids content process requires that the clay suspension be in a fluid state, that is, that the solids content of the crude clay suspension be less than about 50% by weight and usually in the range of 20% to 35% by weight. Unfortunately, such low solids processing of the crude kaolin requires that significant dewatering and drying be required to ready the treated clay product for economic transport. Significant economic benefits would be obtained if the crude kaolin clay could be processed at a high solids content, that is, at least about 65% by weight, so that the dewatering and subsequent drying of the treated clay could be minimized if not eliminated.

One such process for treating kaolinitic clays at high solids is disclosed in U.S. Pat. No. 4,186,027. As disclosed therein, a suspension of raw kaolinitic clay is formed in water at a solids content of 60% to 75% and at a pH in the range of from 7.0 to 11.0 with a dispersing agent. The fluid suspension of clay containing the dispersing agent is then treated with a water-soluble bleaching agent under alkaline pH conditions for a time sufficient to give the desired improvement and brightness of the clay. The treated clay product is said to not require any dewatering prior to shipment. This patent teaches that the suspensions must be prepared at a pH in the range of 7 to 11 in that suspensions outside of that range are allegedly too viscous to be refined successfully in a scroll-type centrifuge to give a product which is substantially free of particles having an equivalent spherical diameter larger than 10 microns. A drawback of such a high solids processing of the kaolinitic clay at an alkaline pH is that most of the papermaking processes used in the United States are carried out under acidic conditions. Therefore, it would be necessary to add additional acidic compounds in the papermaking process to neutralize an alkaline clay filler material produced from clay processing at a alkaline pH as disclosed in U.S. Pat. No. 4,186,027. Additionally, the clay filler material produced at an alkaline pH does not have good viscosity stability in that the viscosity of the clay filler produced in accordance with that process shows a significant increase in viscosity over time in storage. Further, beneficiation at an alkaline pH does not result in significant color improvement over the color characteristics of the crude.

Recently, a process has been developed for beneficiating a crude kaolinitic clay mineral at high solids under acidic conditions to produce a clay filler for use in papermaking. As disclosed in commonly assigned U.S. patent application Ser. No. 513,888, of Mitchell H. Koppelman and Ingrid K. Migliorini, filed July 14, 1983, crude kaolin clay is blunged with water containing a dispersing agent consisting of a blend of from about 20% to about 50% by weight of a water-soluble carbonate, about 20% to about 50% by weight of a water-soluble polyacrylate, and from 0% to about 60% by weight of a water-soluble anionic phosphate, to form a high solids fluid aqueous clay suspension having an acidic pH less than 7.0. This clay suspension is then fractionated to reduce the percentage of particles therein larger than 45 microns to not more than 0.2% by weight. The fractionated clay suspension is treated with an aqueous alkaline leaching solution containing a water-soluble reducing agent at a treatment level ranging from 1 to 6 pounds of reducing agent per ton of dry clay to convert ferric ions to ferrous ions. The treated clay suspension has a solids content of at least 65% by weight, a low grit content, an acid pH, and a brightness of at least 84, and is suitable without further dewatering for use as a clay filler in making paper.

One problem associated with such high solids processing of clay slurries is that high treatment levels in the leaching step, that is, for treatment levels in the range of 4 to 6 or more pounds of reducing agent per ton of dry clay, the viscosity of the treated clay product is unstable, that is, the viscosity increases with shelf age, and is often too high, that is, greater than about 2000 centipoise at 10 rpm, for practical use in the papermaking process. Therefore, crude clays having a low brightness, and thus requiring high levels of reducing agent in order to yield an acceptable product from a brightness standpoint, cannot be processed in this manner since the viscosity of the resultant product will be too high and unstable.

Accordingly, it is an object of the present invention to provide an improved process for beneficiating crude kaolinitic clays of low brightness via leaching a slurry of the clay at a high solids content and at high leaching treatment levels to produce a paper filler product having a stable improved brightness and color characteristics and an acceptable and stable viscosity.

SUMMARY OF THE INVENTION

According to the present invention, there is provided an improved process for treating a crude kaolinitic clay mineral, particularly crude clay having a low brightness, at high solids level, to provide a paper filler having improved brightness and acceptable viscosity, the improvement comprising the post-leaching treatment of the clay product with an oxidizing agent to destroy free-radical byproducts which are produced in the leaching process at high treatment levels and which are believed to cause an unacceptable rise in the viscosity of the leached clay product.

A fluid aqueous suspension of crude kaolinitic material is formed having a solids content of at least about 55% by weight, and preferably in the range of 65% to 75% by weight, and containing a dispersing agent. After subjecting the suspension to a fractionation process to produce a slurry having a particle size of 92-95% finer than 2 microns, the fractionated suspension is treated with an aqueous leaching solution containing a water-soluble reducing agent and allowed to leach under acidic conditions for a sufficient time to increase the brightness and improve the coloration of the clay mineral therein. The suspension, after treatment with the leaching solution, is treated with an oxidizing agent to destroy free-radical byproducts which are produced in the leaching process at high treatment levels. The clay product having been treated with an oxidizing agent subsequent to leaching has a stable improved brightness and a reduced and stable viscosity which makes it acceptable as a paper filler.

DESCRIPTION OF THE PREFERRED EMBODIMENTS

The present invention can perhaps be better understood with reference to the following examples and the discussion thereof presented hereinafter. These examples are to be regarded as illustrative, but not in any way limiting, of the present invention.

EXAMPLE 1

A crude kaolin clay (Califf crude) was blunged with an aqueous dispersing solution comprising a 0.33% sodium hexametaphosphate and 0.17% soda ash to form a 70-71% solids, based on dry weight, aqueous clay suspension. After screening through a 250 mesh screen, the 70%+ solids clay suspension was fractionated on a centrifuge to give a product slurry having a particle size of 92-95% finer than 2 microns. The product slurry from the fractionation step had a solids content of approximately 69%. To simulate leaching at treatment levels of zero, one, two, four and six pounds of reducing agent per ton of clay on a dry basis, appropriate amounts of sodium dithionite dissolved in 5 milliliters of water were added, per 100 grams clay on a dry basis, to samples of the 69% solids fractionated slurry, which reduced the solids content to 67%. Each sample of leached slurry was allowed to stand for 48 hours prior to removing for determining the predispersed brightness. Additional samples of each of the leached slurries were also taken at this point and dried to a solids content of 70% for use in determining the Brookfield viscosity of the leached slurry. Additional dispersant was added, when necessary, to maintain optimum dispersion.

The viscosity and brightness measurements for each of the clay suspension of Example 1 are recorded in Table I.

EXAMPLE 2

A crude kaolin clay (Wrens crude) was blunged with an aqueous dispersing solution comprising a 0.33% sodium hexametaphosphate and 0.17% soda ash to form a 70-71% solids, based on dry weight, aqueous clay suspension. After screening through a 250 mesh screen, the 70%+ solids clay suspension was fractionated on a centrifuge to give a product slurry having a particle size of 92-95% finer than 2 microns. The product slurry from the fractionation step had a solids content of approximately 69%. To simulate leaching at treatment levels of zero, four and six pounds of reducing agent per ton of clay on a dry basis, appropriate amounts of sodium dithionite dissolved in 5 milliliters of water were added to 100 grams, on a dry basis, of the 69% solids, fractionated slurry, which reduced the solids content to 67%. The leached slurry was allowed to stand for 48 hours prior to removing for a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion.

The viscosity and brightness measurements for each of the clay suspensions of Example 1 are recorded in Table I.

TABLE I

| Example No. | Leaching Treatment (pounds sodium dithionite/ton of dry clay) | Brookfield Viscosity (centipoise at 10 rpm) | Predispersed Acid Flocculated Brightness |
| --- | --- | --- | --- |
| (1a) | 0.0 | 550 | 81.0 |
| (1b) | 1.0 | 800 | 82.4 |
| (1c)-Califf | 2.0 | 900 | 83.3 |
| (1d) | 4.0 | 1500 | 85.1 |
| (1e) | 6.0 | 2660 | 85.8 |
| (2a) | 0.0 | 650 | 79.6 |
| (2b)-Wrens | 4.0 | 2600 | 83.0 |
| (2c) | 6.0 | 9000 | 83.6 |

Figure 1:
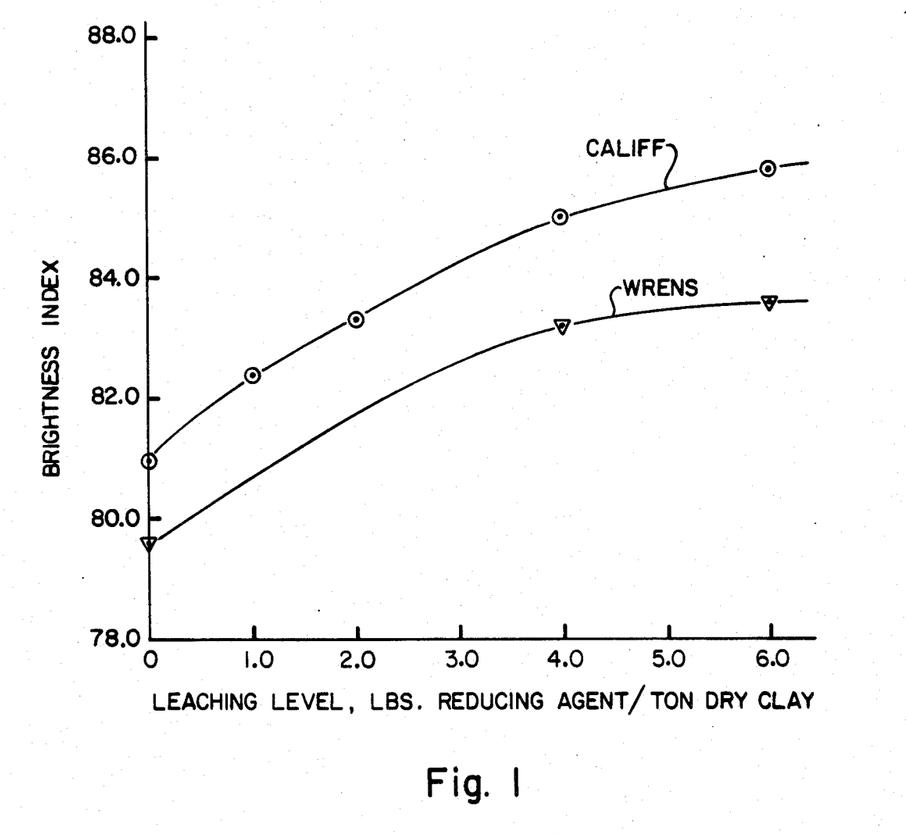
FIG. 1 of the drawing illustrates the increase in brightness produced by leaching a clay slurry with a reducing agent.
Figure 2:
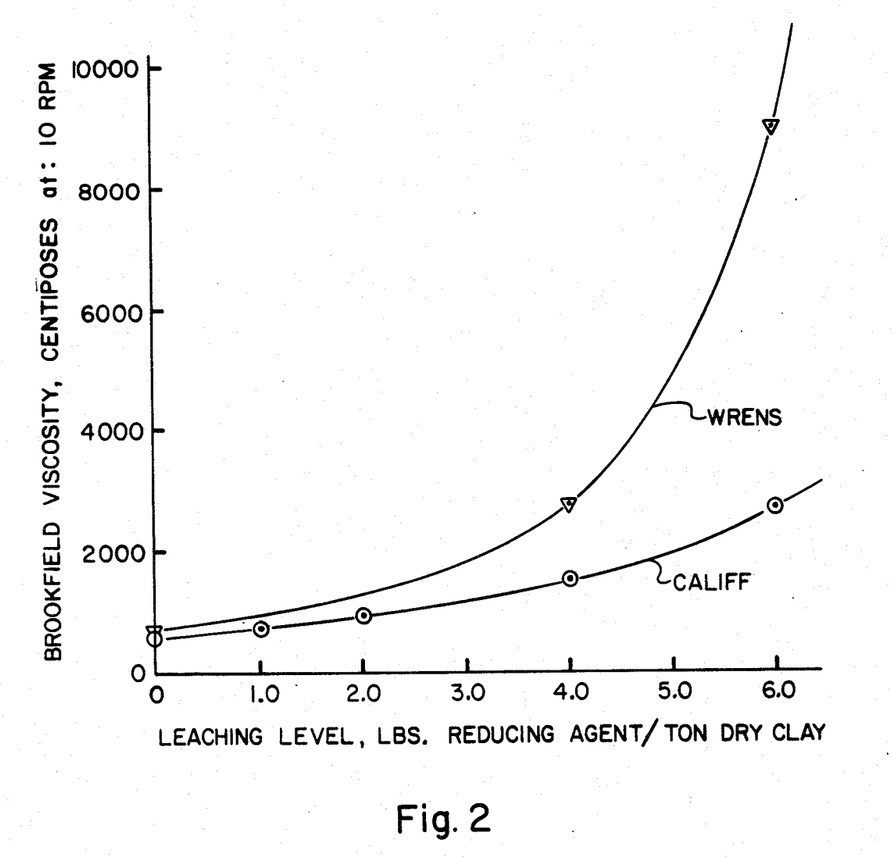
FIG. 2 of the drawing illustrates the adverse increase in viscosity attendant with leaching a clay slurry with a reducing agent without post-leaching oxidation as in the prior art.

The brightness and viscosity measurements for the clay slurries processed in Examples 1 and 2, recorded in Table I above, are shown graphically in FIGS. 1 and 2, respectively, as a function of leaching treatment level. As illustrated in FIG. 1, the brightness of the clay slurry is improved, as expected, via leaching with the brightness increasing with increased treatment levels at least up to the level of treatment of six pounds of sodium dithionite per ton of clay on a dry basis. However, as illustrated in FIG. 2, there is also an adverse effect on the rheological properties of the clay slurry attendant with such leaching when unreacted leaching agent and leaching byproducts are not removed by post-leaching oxidation and filtration. As seen in FIG. 2, the viscosity of the Califf clay slurry increased by a factor of about 4 from 550 centipoise at 10 rpm in an untreated state to 2660 centipoise at 10 rpm after leaching at a treatment level of 6.0 pounds sodium dithionite per ton of dry clay. Similarly, the viscosity of the Wrens clay slurry increased by a factor of almost 14 from 650 centipoise at 10 rpm in an untreated state to 9000 centipoise at 10 rpm after leaching at a treatment level of 6.0 pounds sodium dithionite per ton of dry clay. As will be illustrated hereinafter, this adverse increase in viscosity with leaching can be greatly reduced in accordance with Applicants' invention, while maintaining improved brightness, by post-leaching oxidation and filtration.

EXAMPLE 3

A crude kaolin clay (Califf crude) was blunged with an aqueous dispersing solution comprising 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliters of a 4% sodium hydroxide solution was added to 100 grams, on a dry basis, of the 69% solids, fractionated slurry. The leached slip had a pH of 7.5 and a solids content of 67%. The leached slurry was allowed to stand for 48 hours prior to removing for a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 2730 centipoise at 10 rpm and a predispersed brightness of 85.7.

EXAMPLE 4

A crude kaolin clay (Califf crude) was blunged with an aqueous dispersing solution comprising a 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliliters of a 2% solution of tetrasodium pyrophosphate was added to 100 grams, on a dry basis, of the 69% solids, fractionated slurry. The leached slurry had a pH of 6.7 and a solids content of 67%. The leached slurry was allowed to stand for 48 hours prior to removing a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 1920 centipoise at 10 rpm and a predispersed brightness of 85.3.

EXAMPLE 5

A crude kaolin clay (Califf crude) was blunged with an aqueous dispersing solution comprising a 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliliters of a 2% solution of potassium tripolyphosphate was added to 100 grams, on a dry basis, of the 69% solids, fractionated slurry. The leached slurry had a pH of 6.6 and a solids content of 67%. The leached slurry was allowed to stand for 48 hours prior to removing a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 1680 centipoise at 10 rpm and a predispersed brightness of 85.5.

EXAMPLE 6

A crude kaolin clay (Wrens crude) was blunged with an aqueous dispersing solution comprising a 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliliters of a 4% sodium hydroxide solution was added to 100 grams, on a dry basis, of the 69% solids, fractionated slurry. The leached slurry had a pH of 7.5 and a solids content of 67%. The leached slurry was allowed to stand for 48 hours prior to removing a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 3280 centipoise at 10 rpm and a predispersed brightness of 84.4.

EXAMPLE 7

A crude kaolin clay (Wrens crude) was blunged with an aqueous dispersing solution comprising a 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliliters of a 2% solution of tetrasodium pyrophosphate was added to 100 grams, on a dry basis, of the 69% solids, fractionated slurry. The leached slurry had a pH of 6.7 and a solids content of 67%. The leached slurry was allowed to stand for 48 hours prior to removing a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 2000 centipoise at 10 rpm and a predispersed brightness of 83.2.

EXAMPLE 8

A crude kaolin clay (Wrens crude) was blunged with an aqueous dispersing solution comprising a 0.33% sodium hexametaphosphate and 0.17% soda ash to form a 70–71% solids, based on dry weight, aqueous clay suspension. After screening through a 250 mesh screen, the 70%+ solids clay suspension was fractionated on a centrifuge to give a product slurry having a particle size of 92–95% finer than 2 microns. The product slurry from the fractionation step had a solids content of approximately 69%. To simulate leaching at a treatment level of four pounds of reducing agent per ton of clay on a dry basis, 0.20 grams of sodium dithionite dissolved in 5 milliliters of a 2% solution of potassium tripolyphosphate was added to 100 grams, on a dry basis, of the 69% solids, fractionated slurry. The leached slurry had a pH of 6.6 and a solids content of 67%. The leached slurry was allowed to stand for 48 hours prior to removing a sample for use in determining the predispersed brightness. An additional sample of the leached slurry was also taken at this point and dried to a solids content of 70% for use in determining the Brookfield viscosity of the leached slurry. Additional dispersant was added, when necessary, to maintain optimum dispersion. The leached slurry had a Brookfield viscosity of 1400 centipoise at 10 rpm and a predispersed brightness of 83.6.

TABLE IIa

| Example No. | Leaching Treatment | Brookfield Viscosity at 24 hrs. (centipoise at 10 rpm) | Hercules Viscosity Stability Ratio | Predispersed Acid Flocculated Brightness |
|---|---|---|---|---|
| 1d | sodium dithionite in water | 1500 | 1.6 | 85.1 |
| 3 | sodium dithionite in 4% sodium hydroxide solution | 2730 | 1.57 | 85.7 |
| 4 | sodium dithionite in tetrasodium pyrophosphate | 1920 | 1.25 | 83.3 |
| 5 | sodium dithionite in potassium tripolyphosphate | 1680 | 1.34 | 85.5 |

TABLE IIb

| Example No. | Leaching Treatment | Brookfield Viscosity at 24 hrs. (centipoise at 10 rpm) | Hercules Viscosity Stability Ratio | Predispersed Acid Flocculated Brightness |
|---|---|---|---|---|
| 2b | sodium dithionite in water | 2600 | 1.80 | 83.0 |
| 6 | sodium dithionite in 4% sodium hydroxide solution | 3200 | 2.43 | 84.4 |
| 7 | sodium dithionite in tetrasodium pyrophosphate | 2000 | 1.25 | 83.2 |
| 8 | sodium dithionite in potassium tripolyphosphate | 1400 | 1.71 | 83.6 |

As seen in Table IIa and IIb for the two different crudes, the addition of a dispersing agent in conjunction with the leaching treatment by dissolving the leaching agent in an aqueous solution of the dispersing agent prior to treating the clay slurry therewith can result in an improvement in the brightness and the viscosity stability of the product.

In Table IIa for Califf clay, the product clay slurries of Examples 3, 4 and 5, prepared by leaching with an aqueous solution of four pounds of sodium dithionite dissolved, respectively, in sodium hydroxide, tetrasodium pyrophosphate, and potassium tripolyphosphate, are compared with the product clay slurry of Example 1d prepared by leaching with a solution of four pounds of sodium dithionite dissolved in water without the addition of any dispersing agent. Similarly, in Table IIb for Wrens clay, the product clay slurries of Examples 6, 7 and 8, prepared by leaching with an aqueous solution of four pounds of sodium dithionite dissolved, respectively, in sodium hydroxide, tetrasodium pyrophosphate, and potassium tripolyphosphate, are compared with the product clay slurry of Example 2b prepared by leaching with a solution of four pounds of sodium dithionite dissolved in water without the addition of any dispersing agent.

As can be seen in Tables IIa and IIb, the addition of the dispersing agents tetrasodium pyrophosphate or potassium tripolyphosphate to the leaching agent resulted in an improved brightness and greatly improved viscosity stability for both clays. The addition of tetrasodium pyrophosphate to the sodium dithionite leaching chemical resulted in the greatest improvement in viscosity stability, while the addition of potassium tripolyphosphate to the sodium dithionite leaching chemical resulted in the lowest viscosity product. The addition of sodium hydroxide to the leaching chemical resulted in the greatest improvement in brightness but also caused an unacceptable increase in both viscosity for both clays and also in viscosity instability for the Wrens clay.

Accordingly, in the preferred embodiment of the present invention, the leaching solution comprises an aqueous solution of a water-soluble leaching agent and a water-soluble anionic phosphate.

EXAMPLE 9

A crude kaolin clay (Califf crude) slurry was prepared in accordance with the procedure outlined in Example 5 and then further processed in accordance with the present invention with a post-leaching treatment with an oxidizing agent. More specifically, the leached slurry was allowed to stand for 48 hours prior to treating the leached slurry with an oxidizing agent by adding sodium perborate to the leached slurry at a treatment level of 0.1 grams of oxidizing agent per 100 grams of dry clay. Samples of the post-leaching treated clay slurry were taken for use in determining the spray dried brightness, the acid flocculated brightness, and the Brookfield viscosity. The post-leaching treated clay slurry had an acid flocculated brightness of 85.2, a spray dried brightness of 84.6, and a Brookfield viscosity at 10 rpms of 1650 centipoise after standing for 24 hours and of 2050 centipoise after standing for 2 weeks.

EXAMPLE 10

A crude kaolin clay (Califf crude) slurry was prepared in accordance with the procedure outlined in Example 5 and then further processed in accordance with the present invention with a post-leaching treatment with an oxidizing agent. More specifically, the leached slurry was allowed to stand for 48 hours prior to treating the leached slurry with an oxidizing agent by adding hydroxylamine hydrochloride to the leached slurry at a treatment level of 0.05 grams of oxidizing agent per 100 grams of dry clay. Samples of the post-leaching treated clay slurry were taken for use in determining the spray dried brightness, the acid flocculated brightness, and the Brookfield viscosity. The post-leaching treated clay slurry had an acid flocculated brightness of 85.45, a spray dried brightness of 85.25, and a Brookfield viscosity at 10 rpms of 1650 centipoise after standing for 24 hours and of 2200 centipoise after standing for 2 weeks.

EXAMPLE 11

A crude kaolin clay (Califf crude) slurry was prepared in accordance with the procedure outlined in Example 5 and then further processed in accordance with the present invention with a post-leaching treatment with an oxidizing agent. More specifically, the leached slurry was allowed to stand for 48 hours prior to treating the leached slurry with an oxidizing agent by adding Pennstop 2697 (N,N-diethylhydroxylamine) to the leached slurry at a treatment level of 0.15 grams of oxidizing agent per 100 grams of dry clay. Samples of the post-leaching treated clay slurry were taken for use in determining the spray dried brightness, the acid flocculated brightness, and the Brookfield viscosity. The post-leaching treated clay slurry had an acid flocculated brightness of 85.2, a spray dried brightness of 84.1, and a Brookfield viscosity at 10 rpms of 1680 centipoise after standing for 24 hours and of 1850 centipoise after standing for 2 weeks.

EXAMPLE 12

A crude kaolin clay (Wrens crude) slurry was prepared in accordance with the procedure outlined in Example 5 and then further processed in accordance with the present invention with a post-leaching treatment with an oxidizing agent. More specifically, the leached slurry was allowed to stand for 48 hours prior to treating the leached slurry with an oxidizing agent by adding Pennstop 2607 (N,N-diethylhydroxylamine) to the leached slurry at a treatment level of 0.15 grams of oxidizing agent per 100 grams of dry clay. Samples of the post-leaching treated clay slurry were taken for use in determining the spray dried brightness, the acid flocculated brightness, and the Brookfield viscosity. The post-leaching treated clay slurry had an acid flocculated brightness of 83.4, and a Brookfield viscosity at 10 rpms of 2500 centipoise after standing for 24 hours.

TABLE III

| Example No. | Post-Leaching Oxidizing Agent | Brookfield Viscosity (centipoise at 10 rpm) at 24 hrs. | at 2 wks. | Hercules Viscosity Stability Ratio | Predispersed Acid Flocculated Brightness | Brightness Stability |
| --- | --- | --- | --- | --- | --- | --- |
| 5 | NONE | 1680 | 2050 | 1.34 | 85.5 | 1.3 |
| 9 | sodium perborate | 1650 | 2050 | 1.33 | 85.2 | 0.6 |
| 10 | hydroxylamine hydrochloride | 1860 | 2200 | 1.18 | 85.45 | 0.2 |
| 11 | N,N—diethylhydroxylamine | 1680 | 1850 | 1.17 | 85.2 | 1.1 |
| 2c | NONE | 9000 | — | — | 83.6 | — |
| 12 | N,N—diethylhydroxylamine | 2500 | — | — | 83.4 | — |

As seen in Table III, a high quality clay product having good brightness and improved rheological properties can be obtained for both crude clays by treating the leached clay slurry with an oxidizing agent in accordance with the present invention to oxidize unreacted leaching agent and byproducts formed during the leaching process. Three specific oxidizing agents: sodium perborate, hydroxylamine hydrochloride, and N,N-diethylhydroxylamine were treated. The use of N,N-diethylhydroxylamine (Examples 11,12) resulted in clay products from both clays having a reduced viscosity, and a greatly improved viscosity stability, but about the same brightness and brightness stability, when compared to the clay products Produced from these clays (Examples 5 and 2c respectively) treated via the same processes through the leaching step but without post-leaching oxidation in accordance with the present invention.

The use of sodium perborate or hydroxylamine hydrochloride as the oxidizing agent for post-leaching oxidation in accordance with the present invention also resulted in clay products having improved brightness and rheological properties. The use of sodium perborate or hydroxylamine hydrochloride resulted in significantly improved brightness stability in the oxidized clay product. With sodium perborate as the oxidizing agent, a slight improvement in viscosity stability was also noted, while using hydroxylamine hydrochloride as the oxidizing agent resulted in a significant improvement in viscosity stability but at a slight increase in viscosity.

EXAMPLE 13

A crude kaolin clay (Califf crude) was blunged with an aqueous dispersing solution comprising a blend of 0.12 grams sodium polyacrylate, 0.25 grams sodium hexametaphosphate and 0.17 grams sodium carbonate, under optimum conditions, to form 60-65% solids suspension. The dispersed clay suspension was then fractionated on a centrifuge to give a product suspension having a particle size of 92-95% finer than 2 microns. After fractionation, the solids content was adjusted to 55% and 0.3 grams of sodium dithionite dissolved in 5 milliliters of water was added to 100 grams, on a dry basis, of the clay suspension to simulate leaching at a treatment level of six pounds of reducing agent per ton of clay on a dry basis. The fractionated clay suspension was also acidified with sulfuric acid to a pH of 3.0-3.5. After mixing for one hour, the leached clay suspension was filtered via high pressure filtration on a Baroid Filter Press to form a filter cake at 74% solids. This filter cake was then redispersed to form a 70% solids slurry. The leached clay had a predispersed brightness of 84.4 and a Brookfield viscosity of 10 rpm of 2840 centipoise after standing for 24 hours.

EXAMPLE 14

A crude kaolin clay (Califf crude) was blunged with an aqueous dispersing solution comprising a blend of 0.12 grams sodium polyacrylate, 0.25 grams sodium hexametaphosphate and 0.17 grams sodium carbonate, under optimum conditions, to form 60-65% solids suspension. The dispersed clay suspension was then fractionated on a centrifuge to give a product suspension having a particle size of 92-95% finer than 2 microns. After fractionation, the solids content was adjusted to 55% and 0.3 grams of sodium dithionite dissolved in 5 milliliters of water was added to 100 grams, on a dry basis, of the clay suspension to simulate leaching at a treatment level of six pounds of reducing agent per ton of clay on a dry basis. The fractionated clay suspension was also acidified with sulfuric acid to a pH of 3.0-3.5. The leached clay suspension was then subjected to post-leaching oxidation by adding 0.20 grams of Pennstop 2697 (N,N-diethylhydroxylamine) per 100 grams of dry clay. The post-leaching treated clay suspension was then filtered via high pressure filtration on a Baroid Filter Press to form a filter cake at 74% solids. This filter cake was then redispersed to form a 70% solids slurry. The post-leaching treated clay had a predispersed brightness of 84.0 and a Brookfield viscosity of 10 rpm of 1700 centipoise after standing for 24 hours.

EXAMPLE 15

A crude kaolin clay (Wrens crude) was blunged with an aqueous dispersing solution comprising a blend of 0.12 grams sodium polyacrylate, 0.25 grams sodium hexametaphosphate and 0.17 grams sodium carbonate, under optimum conditions, to form a 60-65% solids suspension. The dispersed clay suspension was then fractionated on a centrifuge to give a product suspension having a particle size of 92-95% finer than 2 microns. After fractionation, the solids content was lowered to 15% and the pH of the suspension was reduced with sulphuric acid to a pH of 2.5. The clay suspension was then leached by adding thereto 0.3 grams of sodium dithionite dissolved in 5 milliliters of water to 100 grams, on a dry basis, to simulate leaching at a treatment level of six pounds of reducing agent per ton of clay on a dry basis. After mixing for one hour, the leached clay suspension was filtered to remove excess sulfate ions, soluble iron impurities and leaching byproducts. The filtered clay product was then dried to a solids content of 70%. The leached clay had a predispersed brightness of 84.3 and a Brookfield viscosity at 10 rpm of 800 centipoise after standing for 24 hours.

EXAMPLE 16

A crude kaolin clay (Wrens crude) was blunged with an aqueous dispersing solution comprising a blend of 0.12 grams sodium polyacrylate, 0.25 grams sodium hexametaphosphate and 0.17 grams sodium carbonate, under optimum conditions, to form a 60-65% solids suspension. The dispersed clay suspension was then fractionated on a centrifuge to give a product suspension having a particle size of 92-95% finer than 2 microns. After fractionation, the solids content was adjusted to 55% and 0.3 grams of sodium dithionite dissolved in 5 milliliters of water was added to 100 grams, on a dry basis, of the clay suspension to simulate leaching at a treatment level of six pounds of reducing agent per ton of clay on a dry basis. The fractionated clay suspension was also acidified with sulfuric acid to a pH of 3.0-3.5. After mixing for one hour, the leached clay suspension was filtered via high pressure filtration on a Baroid Filter Press to form a filter cake having a 74% solids. This filter cake was then redispersed to form a 70% solids slurry. The leached clay had a predispersed brightness of 84.5 and a Brookfield viscosity at 10 rpm of 1400 centipoise after standing for 24 hours.

EXAMPLE 17

A crude kaolin clay (Wrens crude) was blunged with an aqueous dispersing solution comprising a blend of 0.12 grams sodium polyacrylate, 0.25 grams sodium hexametaphosphate and 0.17 grams sodium carbonate, under optimum conditions, to form 60-65% solids suspension. The dispersed clay suspension was then fractionated on a centrifuge to give a product suspension having a particle size of 92-95% finer than 2 microns. After fractionation, the solids content was adjusted to 55% and 0.3 grams of sodium dithionite dissolved in 5 milliliters of water was added to 100 grams, on a dry basis, of the clay suspension to simulate leaching at a treatment level of six pounds of reducing agent per ton of clay on a dry basis. The fractionated clay suspension was also acidified with sulfuric acid to a pH of 3.0–3.5. The leached clay suspension was then subjected to post-leaching oxidation by adding 0.225 grams of sodium perborate per 100 grams of dry clay. The post-leaching treated clay suspension was then filtered via high pressure filtration on a Baroid Filter Press to form a filter cake at 74% solids. This filter cake was then redispersed to form a 70% solids slurry. The post-leaching treated clay had a predispersed brightness of 84.6 and a Brookfield viscosity of 10 rpm of 700 centipoise after standing for 24 hours.

TABLE IVa

| Example No. | % Solids At Leaching | Post-Leaching Oxidizing Agent | Brookfield Viscosity at 24 hrs. (centipoise at 10 rpm) | Predispersed Acid Flocculated Brightness |
|---|---|---|---|---|
| 13 | 60–65 | NONE | 2840 | 84.4 |
| 14 | 60–65 | N,N—diethyl-hydroxylamine | 1700 | 84.4 |

TABLE IVb

| Example No. | % Solids At Leaching | Post-Leaching Oxidizing Agent | Brookfield Viscosity at 24 hrs. (centipoise at 10 rpm) | Predispersed Acid Flocculated Brightness |
|---|---|---|---|---|
| 15 | 15 | NONE | 800 | 84.3 |
| 16 | 60–65 | NONE | 1400 | 84.5 |
| 17 | 60–65 | sodium perborate | 700 | 84.6 |

The advantage of the process of the preferred embodiment of the invention, as illustrated in Examples 14 and 17, wherein the clay slurry is leached at a high solids content of at least about 55% solids under acidic conditions and the resultant leached clay slurry is treated with an oxidizing agent and pressure filtered to produce a clay product having a solids content of at least 70% solids, is further evidenced by the viscosity and brightness improvements presented in Tables IVa and IVb, respectively, for the Califf and Wrens clays. The post-leaching oxidation of the clay slurry derived from the Califf clay with N,N-diethylhydroxylamine (Example 14) resulted in a clay product having a significantly lower viscosity and only slightly reduced brightness when compared to the product (Example 13) derived from treating the Califf clay in accordance with the high solids beneficiating method disclosed in U.S. patent application Ser. No. 513,888 of Mitchell H. Koppelman and Ingrid K. Migliorini, filed July 14, 1983, but without post-leaching oxidation. The post-leaching oxidation of the clay slurry derived from the Wrens clay with sodium perborate (Example 17) resulted in a clay product having not only a lower viscosity but also a slightly higher brightness when compared either to the product (Example 16) derived from treating the Wrens clay in accordance with the high solids beneficiating method disclosed in the aforementioned application of Koppelman and Migliorini or to the product (Example 15) derived from treating the Wrens clay via typical prior art processes at low solids.

Accordingly, it has been illustrated that even crude kaolin clays, which have generally heretofore been considered to be of poor quality from a rheological and brightness standpoint to be used for making paper filler, may be beneficiated in accordance with the present invention at high solids and high leaching levels with post-leaching oxidation and filtration to yield a clay filler material having a suitable viscosity and brightness for use in the papermaking process. Post-leaching oxidation in accordance with the present invention enables high leaching treatment levels to be used in the leaching process without an adverse increase in the viscosity and decrease in brightness and brightness stability in the product clay filler. Post-leaching oxidation results in the destruction by oxidation of unreacted leaching agent and leaching byproducts which heretofore have resulted in a degradation in brightness of the product clay filler during drying. Through the use of high solids leaching at high treatment levels followed by post-leaching oxidation and press filtration, poorer quality kaolin clays can be used to produce quality clay filler for the papermaking industry without going through the costly filtration and drying steps necessary under current technology not only to increase the solids content to a commercially acceptable level of 70%, but also to remove excess sulfate ions, soluble iron impurities and leaching agent byproducts which adversely affect viscosity, viscosity stability, brightness, and brightness stability.

We claim:

1. A process for treating a crude kaolinitic clay containing iron-containing impurities, comprising:
   a. mixing a crude kaolinitic clay with water having a dispersing agent dissolved therein to form a fluid aqueous suspension of said crude kaolinitic clay, said suspension having a solids content of at least 55% by weight;
   b. subjecting said suspension to a degritting process to reduce the percentage by weight of the particles in said suspension to 92–95% having a particle size finer than 2 microns;
   c. dissolving a water-soluble reducing agent in an aqueous solution of a water-soluble anionic phosphate dispersing agent to form an aqueous leachng solution;
   d. treating said degritted suspension at an acid pH with said aqueous leaching solution at a treatment level of at least four pounds of reducing agent per ton of dry clay for a time sufficient to convert a substantial portion of ferric ions in the iron-containing impurities therein to ferrous ions, said leached suspension having a solids content of at least 55% by weight; and
   e. treating said leached suspension with an oxidizing agent at a treatment level sufficient to oxidize a substantial portion of any unreacted reducing agent and leaching process byproducts in said leached suspension.

2. A process as recited in claim 1 wherein said suspension contains from about 65% to about 75% by weight of solids.

3. A process as recited in claim 1 wherein said dispersing agent is selected from the group consisting of a water-soluble carbonate, a water-soluble anionic phosphate, a water-soluble organic polyacrylate and mixtures thereof.

4. A process as recited in claim 1 wherein said aqueous leaching solution comprises a solution of a water-soluble reducing agent dissolved in water having a water-soluble anionic phosphate dispersing agent dissolved therein, the dispersing agent selected from the group consisting of tetrasodium pyrophosphate, potassium tripolyphosphate, and mixtures there of.

5. A process as recited in claim 5 wherein said leached suspension is treated with said oxidizing agent at a treatment level ranging from about one pound to about three pounds of oxidizing agent per ton of dry clay.

6. A process as recited in claim 5 wherein said oxidizing agent is selected from the group consisting of sodium perborate, diethylhydroxylamine, and hydroxylamine hydrochloride.

7. A process for treating a crude kaolinitic clay containing iron-containing impurities, comprising:
  a. mixing a crude kaolinitic clay with water having a dispersing agent dissolved therein to form a fluid aqueous suspension of said crude kaolinitic clay having a solids content of at least 55% by weight; said dispersing agent selected from the group consisting of a water-soluble carbonate, a water-soluble anionic phosphate, a water-soluble organic polyacrylate, and mixtures thereof;
  b. subjecting said suspension to a degritting process to reduce the percentage by weight of the particles in said suspension to 92–95% having a particle size finer than 2 microns;
  c. treating said degritted suspension at a solids content of at least 55% by weight and at an acid pH with an aqueous leaching solution containing a water-soluble dithionite reducing agent and a water-soluble anionic phosphate dispersing agent at a treatment level of at least four pounds of reducing agent per ton of dry clay so as to convert a substantial portion of ferric ions in the iron-containing impurities in said clay to ferrous ions;
  d. treating said leached suspension with an oxidizing agent at a treatment level ranging from about one to about three pounds of oxidizing agent per ton of dry clay so as to oxidize a substantial portion of any unreacted reducing agent and leaching process byproducts in said leached suspension, said oxidizing agent selected from the group consisting of sodium perborate, diethylhydroxylamine, and hydroxylamine hydrochloride; and
  e. subjecting said leached and oxidized suspension to pressure filtration to form a product filter cake having a solids content of at least 70% by weight.

* * * * *